UNITED STATES PATENT OFFICE 2,544,412

PROCESS FOR MEASURING PERMEABILITY AND POROSITY OF BOREHOLE SUB-STRATA

James M. Bird, Bradford, Pa.

No Drawing. Application October 13, 1949, Serial No. 121,218

3 Claims. (Cl. 250—83.6)

This invention relates to a process for determining the permeability and porosity of the sub-strata of oil wells and other bore holes.

In geophysical prospecting it has heretofore been proposed to use radiological methods for determining the location and other physical characteristics of underground strata. The available processes are not always accurate. Errors occur in the logging record due to the fact that the radioactive material penetrates the face of the bore hole or well. Inasmuch as the effectiveness of the counting instrument is determined by the square of the distance between the instrument and the radioactive material, it can be readily appreciated that the measurement is not always an accurate indication of the physical characteristics of the sub-strata. The present invention relates to a radioactive tracer logging technique in which radioactive colloids are used, of such size that the same will lodge upon the bore hole wall of the sub-strata but will not pass completely thru the pores of the strata. They will collect on the bore hole wall in quantity proportional to the amount of water passing thru the sand or sub-strata and the subsequent measurement will be an accurate indication of the permeability and porosity of the strata where the measurement is taken.

A further object of this invention is the provision of a process for measuring the permeability and porosity of oil well strata in which the porosity of the strata is first ascertained by removing cores or samples of the various subsurface strata and then attempting to pass granular particles of a known size thru the pores of the formation and subsequently using radioactive colloids within a size range which will not pass thru the pores, in the tracer logging operation.

There are various means and methods by which the radioactive material may be applied to the well or bore hole. A suitable container is placed on the ground surface at the well or bore to be tested. A colloidal suspension of radioactive material may be introduced into the bore hole, either by mixing it with water which normally goes into the well, as in the case of an input well, or by introducing it directly into water which has been run into the well especially for radioactive logging purposes. Thereafter, a Geiger-Muller counting instrument or other instrumentality sensitive to radioactivity, is lowered into the well by means of an electrical cable conventionally wound upon a reel located at the well surface. As the counting instrument passes the groups of radioactive particles, impulses or counts are relayed thru the cable to the surface and are indicated on the recording device.

In some wells where tubing is not used, usually new wells, water is placed in the well to above the sand level and thereafter before any appreciable dissipation of the water occurs, the radioactive material is lowered in a suitable breakable vial and broken by means of dropping a weight guided upon a cable, or the vial may be broken by means of a weight located on a spring above the vial. Upon jogging the cable, the weight will break the vial. It usually is desirable to wait three days, more or less, for the fluid carrying the radioactive colloids to move from the bore hole into the formations.

In an intake well which has not been shot, the water with the colloid is injected under superatmospheric pressure up to 1000 lbs. per square inch.

It is within the contemplation of this invention to use this process in connection with sub-strata which has been "shot," or where large fissures occur in the sub-strata.

The radioactive material is preferably Cobalt-60, but other radioactive isotopes may be used, such as:

Cesium 137 ($Cs^{137}$)
Cesium 134 ($Cs^{134}$)
Silver 110 ($Ag^{110}$)
Tantalum 182 ($Ta^{182}$)
Zinc 65 ($Zn^{65}$)

Cobalt-60 is preferable because of its half-life, superior radiation, ease of preparation and low cost per millicurie.

The sub-strata formation varies in different geographical districts. It is therefore desired to test the sub-strata in order to determine the size of the radioactive particles which will not pass thru the pores of the sub-strata formation. By way of example, in the Bradford, Pennsylvania, oil fields three typical cores of sand representing three degrees of porosity were obtained, to wit: (a) loose or extremely porous sand, (b) sand of average porosity, and (c) tight sand. The pore sizes of each were determined and it was found that they did not permit penetration of particles of from one to five microns in size. Of course these particles were held in suspension in solution for the test. Actually, in the testing, particles of progressive smaller size were used until the micron size of a particle that would pass thru the sand formation was found. Such tests should be made in connection with sub-strata formation wherever radioactive tracer logging is to be conducted.

It is recognized that in some cases radioactive particles in size of from five to twenty microns may be desirable, where the pores or fissures are large, and radioactive particles of from twenty to fifty microns can be used in special cases where the fissures are large, such as in a well where the sub-strata has been "shot."

The process of manufacturing radioactive particles of the desired size is selective. They may be obtained by ball milling the radioactive material, such as cobaltic oxide containing radioactive Cobalt-60 for a sufficient length of time to permit 90% to pass thru a porous frit of the desired micron size.

It is intended to supply a colloidal suspension at a radioactive concentration of ten microcuries per cc. of water. At this concentration the suspension does not shown any tendency to settle over a period of sixty days. Indeed it is believed that the suspension will remain homogeneous over an indefinite period. Computation of the amount of the radioactive colloidal suspension has been based upon a bore or well seven inches in diameter, and the amount of the radioactive solution to be used will be proportional to the square of the diameter of the bore or well. This determination is also based upon an ultimate detection with a 10" brass Geiger tube of 1" diameter.

Thus, by way of example, assuming that we have a 75' deep well or bore, 7" diameter, with a capacity of 110 gallons. It is proposed to first inject 55 gallons of water containing the radioactive suspension into the well. Fifty-five gallons of ordinary water is then added and mixed with the water in the well. The total amount of water is then forced thru the porous sub-strata or sand by means of pressure applied by injection or hydrostatically. The recommended radioactive concentration per linear foot of a well of this size is —0.6 microcurie. Since the total length of the well is 75', the total amount of activity will be 45 microcuries. Therefore, to the initial 55 gallons, 4.5 cc. of the radioactive suspension containing 10 microcuries per cc. is mixed with the water before pouring into the well.

In the above example where the porosity of the well is completely uniform, a net counting rate of 210 counts per minute plus the 90 counts a minute background rate of the 10" Geiger tube, or a gross counting rate of 300 counts per minute. This counting rate would be obtained thruout the entire length of the well. If certain portions of the well are ten times more porous than the average porosity, then the total counting rate would be increased to approximately 2200 counts per minute, and if certain portions were one hundred times more porous, the total counting rate would be 21,000 counts per minute. The count reads true because the radioactive colloids are filtered out upon the wall surface of the bore and do not appreciably penetrate the pores or voids in the bore.

It has been experimentally ascertained that no appreciable precipitation or salting out occurs in a two-hour period if the concentration of radioactive colloids does not exceed 4 microcuries per gallon of 10% salt solution. It is to be noted that this is in accord with the above example where 45 microcuries of the colloidal suspension is used in 110 gallons of water in the well or bore.

Various changes in the steps of using the radioactive colloidal solution as well as changes in the radioactive intensity of the solution may be made to the invention as herein described without departing from the spirit of the invention or the scope of the claims.

I claim:

1. The process of determining permeability of sub-strata in the bore of a well which consists in depositing in the bore of the well a colloidal dispersion of radioactive cobalt in liquid and permitting said liquid to permeate into the sub-strata formation, the radioactive cobalt colloids being of a size to filter out directly upon the natural bore surface of the well at the sub-strata thru which the liquid penetrates without appreciable penetration of the colloids into the sub-strata beyond the bore.

2. The method of determining the permeability and porosity of oil well sub-strata which consists in removing a sample of sand strata of sub-surface formation, determining by attempts to pass a radioactive material, in particle form, in suspension in a liquid, thru the pores of the sample the size of the particles which will not pass thru said pores but collect upon the sample at the pore entrances, and depositing a liquid with radioactive colloids of the aforementioned determined particle size in suspension therein so that the colloids will collect on the well bore wall at the point of permeation of the liquid into the permeable strata without passing thru said pores, and then measuring the radioactivity of said bore wall supported radioactive colloids along the well bore.

3. The method of tracer logging the permeable strata facing a bore hole wherein the pores of the strata are in the main less than 1 micron in width, which consists in depositing in the bore hole a liquid having particles of radioactive material suspended therein of a size from 1 micron to 5 microns in width, permitting the liquid to permeate the sub-strata with a filtering out of said particles on the bore hole wall at the permeable strata, and subsequently measuring the intensity of radioactivity of said particles as gathered upon the strata along the length of the bore hole.

JAMES M. BIRD.

REFERENCES CITED

The following references are of record in the file of this patent:

UNITED STATES PATENTS

| Number | Name | Date |
|---|---|---|
| 2,339,129 | Albertson | Jan. 11, 1944 |
| 2,364,975 | Heigl et al. | Dec. 12, 1944 |
| 2,390,931 | Fearon | Dec. 11, 1945 |